United States Patent
Chidambaram Nachiappan et al.

(10) Patent No.: US 11,748,284 B2
(45) Date of Patent: *Sep. 5, 2023

(54) SYSTEMS AND METHODS FOR ARBITRATING TRAFFIC IN A BUS

(71) Applicant: Apple Inc., Cupertino, CA (US)

(72) Inventors: Nachiappan Chidambaram Nachiappan, Santa Clara, CA (US); Jaideep Dastidar, San Jose, CA (US); Yiu Chun Tse, Cupertino, CA (US); Ripudaman Singh, New Delhi (IN); Shawn Munetoshi Fukami, Newark, CA (US); Benjamin K. Dodge, San Jose, CA (US); Vinodh R. Cuppu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,565

(22) Filed: Jul. 14, 2021

(65) Prior Publication Data

US 2021/0342282 A1   Nov. 4, 2021

(51) Int. Cl.
    *G06F 13/366* (2006.01)
    *G06F 13/40* (2006.01)
(52) U.S. Cl.
    CPC ........ *G06F 13/366* (2013.01); *G06F 13/4031* (2013.01)
(58) Field of Classification Search
    None
    See application file for complete search history.

(56) References Cited

U.S. PATENT DOCUMENTS

| | | | |
|---|---|---|---|
| 5,870,580 A | * | 2/1999 | Walker ................. G06F 9/3834 712/E9.05 |
| 7,283,558 B2 | | 10/2007 | Ferolito |
| 7,474,642 B1 | | 1/2009 | Chheda |
| 8,532,098 B2 | | 9/2013 | Reed et al. |
| 10,402,120 B2 | | 9/2019 | Balakrishnan et al. |
| 11,093,425 B2 | | 8/2021 | Chidambaram Nachiappan et al. |
| 2003/0110322 A1 | | 6/2003 | Wolrich et al. |
| 2012/0089759 A1 | | 4/2012 | Shirlen et al. |
| 2016/0142331 A1 | | 5/2016 | Daniel et al. |
| 2016/0373362 A1 | | 12/2016 | Cheng et al. |

* cited by examiner

*Primary Examiner* — Farley Abad
*Assistant Examiner* — Dayton Lewis-Taylor
(74) *Attorney, Agent, or Firm* — Robert C. Kowert; Kowert, Hood, Munyon, Rankin & Goetzel, P.C.

(57) ABSTRACT

A system and method for efficiently arbitrating traffic on a bus. A computing system includes a fabric for routing traffic among one or more agents and one or more endpoints. The fabric includes multiple arbiters in an arbitration hierarchy. Arbiters store traffic in buffers with each buffer associated with a particular traffic type and a source of the traffic. Arbiters maintain a respective urgency counter for keeping track of a period of time traffic of a particular type is blocked by upstream arbiters. When the block is removed, the traffic of the particular type has priority for selection based on the urgency counter. When arbiters receive feedback from downstream arbiters or sources, the arbiters adjust selection priority accordingly. For example, changes in bandwidth requirement, low latency tolerance and active status cause adjustments in selection priority of stored requests.

20 Claims, 7 Drawing Sheets

SYSTEMS AND METHODS FOR ARBITRATING TRAFFIC IN A BUS

CROSS REFERENCE TO RELATED APPLICATIONS

This application is a continuation of U.S. patent application Ser. No. 16/105,252, entitled "SYSTEMS AND METHODS FOR ARBITRATING TRAFFIC IN A BUS", filed Aug. 20, 2018, the entirety of which is incorporated herein by reference.

BACKGROUND

Technical Field

Embodiments described herein relate to the field of computing systems and, more particularly, to efficiently arbitrating requests during transport.

Description of the Related Art

Systems on chips (SoCs) are becoming increasingly complex with ever increasing numbers of agents within a typical SoC and available endpoints. The agents include one or more of multimedia engines, digital signal processors (DSPs) and processing units, each with one or more of a central processing unit (CPU) and a data parallel processor like a graphics processing unit (GPU). Endpoints include input/output (I/O) peripheral devices such as memory devices, communication interfaces such as radio communication interfaces, speakers, displays and so on. Data is shared among the different agents of the SoC and among the available endpoints.

Typically, an interconnect transports transactions from a source, such as an agent, to a destination such as another agent or an endpoint. In some cases, the interconnect is a communication fabric. One or more queues, data stores and other data storage components are included in the communication fabric for providing intermediate storage for commands, messages and data in transit between a source and a destination. The management of the intermediate storage and the number outstanding transactions in transit, such as arbitrating traffic on a bus, becomes complex as the number of agents and endpoints increase. Some examples of the complexities introduced and to be handled by the arbitration logic to maintain performance include alternating workloads and power-performance states of agents and endpoints, ordering dependence between particular requests, and changing available data storage space in the communication fabric.

In view of the above, efficient methods and mechanisms for efficiently arbitrating traffic on a bus are desired.

SUMMARY

Systems and methods for efficiently arbitrating traffic on a bus are contemplated. In various embodiments, a computing system includes a communication fabric for routing traffic among one or more agents and one or more endpoints. In some embodiments, the communication fabric (or fabric) includes one or more intermediate buffers for storing commands and corresponding data during transport. In some embodiments, the one or more intermediate buffers are located in queues distributed across the fabric and one or more data stores. Each agent and each endpoint is both a source and a destination for transactions depending on the direction of traffic flow through the fabric.

In various embodiments, the agents, endpoints and the fabric include arbiters for transferring traffic from a source to a destination. In various embodiments, the fabric includes a hierarchy of multiple levels of arbiters to route traffic from a source to a destination. In some embodiments, traffic on a first bus in the fabric includes access requests, such as read requests and write requests, whereas, traffic on a second bus in the fabric includes messages. An example of a message is a notification to a requesting agent that read response data has returned and the notification includes an index pointing to where the read request data is stored in a downstream data store. Traffic on a third bus includes data corresponding to the access requests or the messages. Although the traffic includes different formats of information, in some embodiments, an arbiter receiving information of a different format from another arbiter uses the same arbitration logic as the other arbiter.

In various embodiments, the arbiters store requests in buffers based on a traffic type of the request. The different traffic types are used to distinguish time-sensitive traffic from non-time-sensitive traffic for routing purposes. In an embodiment, the traffic type of the request is one of a real-time (RT) traffic type, a low latency traffic (LLT) traffic type and a large non-time-sensitive traffic type, which is also referred to as a bulk traffic type. In an embodiment, the source of the traffic is also used to determine which requests are stored in which buffers. For example, a first buffer stores RT requests from a first source and a second buffer stores RT requests from a second source. The source is one of an agent, an endpoint or an arbiter in another level of the multi-level hierarchy of arbiters.

In an example where the traffic includes read requests and write requests, arbiters select a request to send to a destination from multiple stored requests based on a weight. In some embodiments, the arbiters select a request with a largest weight. In an embodiment, the weight is a combination of attributes indicating priority. In some embodiments, the attributes include one or more of an age, a priority level, a quality-of-service parameter, a source identifier, an application identifier or type, such as a real-time application, an indication of traffic type, such as real-time traffic or low latency traffic or bulk traffic, and an indication of a data size associated with the request and so forth.

In various embodiments, a first arbiter maintains multiple urgency counters with one or more urgency counters associated with requests of a particular traffic type. In other embodiments, one or more urgency counters are associated with a particular buffer. In yet other embodiments, one or more urgency counters are associated with an input, such as a leg of the first arbiter, which is connected to output logic of a buffer, another arbiter, or other. In an embodiment, if the first arbiter receiving a message specifying that requests of a first traffic type are unable to be received by an external second arbiter higher in the arbitration hierarchy, then the first arbiter updates a first urgency counter associated with requests of the first traffic type. In other embodiments, the message is associated with a particular input (leg), a particular buffer, or other, and the first arbiter updates the urgency counter associated with the message. In an embodiment, the first arbiter updates this urgency counter by adding a value, such as a given weight, to the value in urgency counter. In another embodiment, the first arbiter updates this urgency counter to a value exceeding a threshold. In an embodiment, the threshold is a weight associated with requests of the first traffic type. In an embodiment, the first arbiter temporarily blocks selection of requests associated with the message such as one of the first traffic type, a particular input (leg), a particular buffer, and so forth.

In some embodiments, one or more of the arbiters in the arbitration hierarchy select a stored request from any of the multiple buffers storing requests of a type not being blocked based on a largest urgency count stored in a respective urgency counter. In an embodiment, when an arbiter determines two or more buffers have a same largest urgency count stored in a respective urgency counter, the arbiter selects a stored request from the two or more buffers based on the weights associated with the two or more buffers. In some embodiments, the least recently serviced buffer is selected. The selected stored request is sent to the next arbiter in the arbitration hierarchy or a destination such as a memory controller for system memory, in one example.

In an embodiment, when an arbiter determines a group of two or more buffers store types of requests with an ordering dependence between them, the arbiter computes a single set of one or more attributes for the two or more dependent groups. In an embodiment, the single set of attributes is a result of merging the attributes of the two or more dependent groups. Merging the attributes includes one or more of selecting a maximum value, selecting a minimum value, determining an average value, determining a sum, and so forth. In some embodiments, a different merge is performed for different attributes. In one example, an average urgency count is determined and put in the single set, a maximum bandwidth requirement is selected and put in the single set, and so forth. In other embodiments, a sum of the urgency counts and a sum of the bandwidth requirements is determined and put in the single set. In some embodiments, only a single set of attributes is maintained, and there is no merging of multiple attributes.

In some embodiments, when an arbiter receives an indication from a source of a request or an arbiter at a lower level in the arbitration hierarchy that specifies a changed bandwidth requirement or a changed low latency tolerance for requests of a particular type, the arbiter adjusts weights for those requests based on the feedback. Similarly, in some embodiments, the feedback includes an indication of an active or inactive status of a source generating requests, and the arbiter adjusts the weights accordingly.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Figure 1:
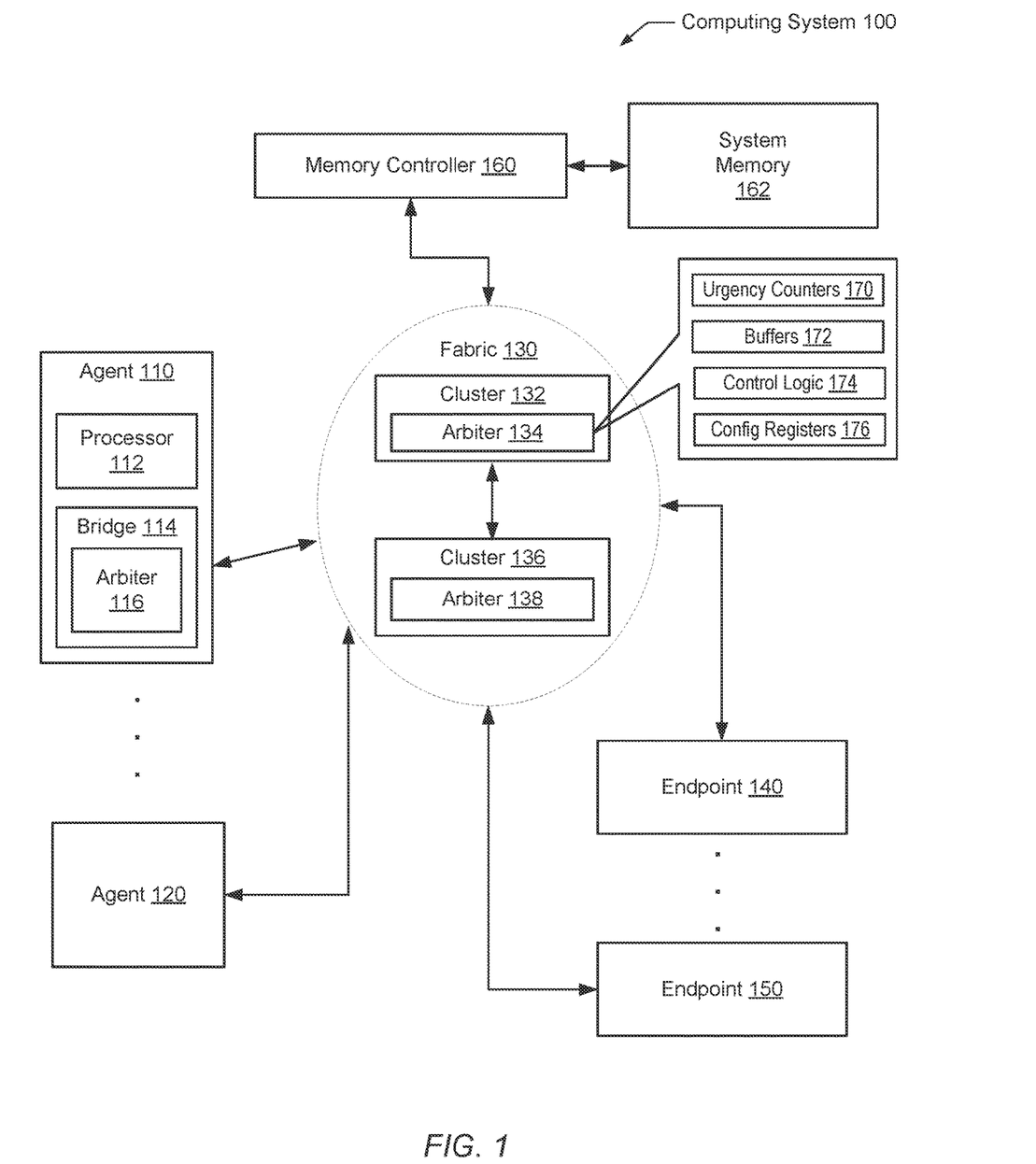
FIG. 1 is a block diagram of one embodiment of a computing system.

Referring to FIG. 1, a generalized block diagram of one embodiment of a computing system 100 is shown. In the illustrated embodiment, communication fabric 130, which is also referred to as fabric 130, routes traffic among agents 110-120, endpoints 140-150 and memory controller 160. Each of agents 110-120, endpoints 140-150 and memory controller 160 is both a source and a destination for traffic depending on the direction of traffic flow through fabric 130. In various embodiments, fabric 130 includes a hierarchy of clusters between agents 110-120 and memory controller 160. Although two clusters 132 and 136 are shown, in other embodiments, any number of clusters is used. As shown, bridge 114 and clusters 132 and 136 include arbiters 116, 134 and 138, respectively. Although a single arbiter is shown within bridge 114 and clusters 132 and 136, in other embodiments, any number of arbiters is used.

In various embodiments, the computing system 100 is a system on a chip (SoC) that includes multiple types of integrated circuits on a single semiconductor die, each integrated circuit providing a separate functionality. In some embodiments, computing system 100 is also referred to as an application specific integrated circuit (ASIC). In other embodiments, the agents 110-120 and endpoints 140-150 are individual dies within a package such as a multi-chip module (MCM). In yet other embodiments, the agents 110-120 and endpoints 140-150 are individual dies or chips on a printed circuit board.

Clock sources, such as phase lock loops (PLLs), interrupt controllers, power managers and so forth are not shown in FIG. 1 for ease of illustration. It is also noted that the number of components of the computing system 100 vary from embodiment to embodiment. In other embodiments, there are more or fewer of each component than the number shown for the computing system 100. In an embodiment, each of the agents 110-120 is a processor complex. The term "processor complex" is used to denote a configuration of one or more processor cores using local storage (not shown), such as a local shared cache memory subsystem, and capable of processing a workload together. For example, in an embodiment, the workload includes one or more programs comprising instructions executed by processor 112. Any instruction set architecture is implemented in various embodiments.

Each of the agents 110-120 includes a processor such as processor 112. Although a single processor is shown, in various embodiments, multiple processors are used, each with one or more processor cores. Processor 112 is one or more of a central processing unit (CPU), a data parallel processor like a graphics processing units (GPU), a digital signal processors (DSP), a multimedia engine, and so forth.

Different types of traffic flows independently through fabric 130. In some embodiments, fabric 130 utilizes a single physical fabric bus to include a number of overlaying virtual channels, or dedicated source and destination buffers, each carrying a different type of traffic. In an embodiment, one or more channels are independently flow controlled with no dependence between transactions in different channels while other channels are dependent on transactions in another channel. In other embodiments, fabric 130 is packet-based, and may be hierarchical with bridges, cross bar, point-to-point, or other interconnects.

In various embodiments, fabric 130 uses one or more bus protocols for transferring messages and data, enforcing an order between transactions with particular transaction types, and ensuring cache coherence among the different agents 110-120 and endpoints 140-150. The supported communication protocols determine allowable transfer sizes, supported burst transfer sizes, supported directions for simultaneous transfers, allowable number of outstanding requests while sending more requests, support of out-of-order completions, supported clock domains, supported interrupt mechanisms, and so forth. In some embodiments, the link interfaces include communication protocol connections such as PCIe (Peripheral Component Interconnect Express), Advanced eXtensible Interface (AXI), and so forth.

In various embodiments, an arbitration hierarchy includes multiple levels of arbiters, such as 116, 134 and 138 to route traffic from a source to a destination. Between each hierarchical level of the arbitration hierarchy are multiple links. For functionality and performance reasons, in some embodiments, a split topology is used where data links are physically separated from the control links. In various embodiments, control links transfer commands and messages, whereas, data links transfer data corresponding to the commands and messages. For example, in an embodiment, traffic on a first bus in fabric 130 includes access requests, such as read requests and write requests, whereas, traffic on a second bus in fabric 130 includes messages. An example of a message is a notification to a requesting one of agents 110-120 that read response data has returned from memory controller 160 and the notification includes an index pointing to where the read request data is stored in a downstream data store. Traffic on a third bus includes data corresponding to the access requests or the messages.

In various embodiments, one or more of the control links and data links are a point-to-point communication channel. At the physical level, a link includes one or more lanes. In an embodiment, links are also separated by traffic type. The different traffic types are used to distinguish time-sensitive traffic from non-time-sensitive traffic for routing purposes. In an embodiment, the traffic type of the request is one of a real-time (RT) traffic type, a low latency traffic (LLT) traffic type and a large non-time-sensitive traffic type, which is also referred to as a bulk traffic type. In an embodiment, links are also separated by source. For example, a first link transfers RT requests from a first source and a second link transfers RT requests from a second source. The source is one of agents 110-120, endpoints 140-150, memory controller 160, and one of arbiters 116, 134 and 138.

As shown, arbiter 134 includes buffers 172 for storing transactions and corresponding payload data during transport. In some embodiments, buffers 172 include one or more queues and one or more data stores. In other embodiments, a given cluster of clusters 132 and 136 include a data store such as an upstream data store for storing write data being transferred to memory controller 160 and a downstream data store for storing read response data being transferred from memory controller 160. In some embodiments, traffic is stored in buffers 172 based on the source of the traffic. For example, in an embodiment, a first buffer of buffers 172 stores traffic from a first source and a second buffer of buffers 172 stores traffic from a second source. The source is one of agents 110-120, endpoints 140-150, memory controller 160, and one of arbiters 116, 134 and 138.

Additionally, in some embodiments, traffic is stored in buffers 172 based on traffic type. In an embodiment, a first buffer of buffers 172 stores RT traffic and a second buffer of buffers 172 stores bulk traffic. Further, in an embodiment, traffic is stored in buffers 172 based on traffic type and source of the traffic. In some embodiments, a first buffer of buffers 172 stores RT traffic from a first source, a second buffer of buffers 172 stores RT traffic from a second source, a third buffer of buffers 172 stores bulk traffic from the first source, and so forth.

In some embodiments, control logic 174 includes a combination of combinatorial logic and sequential elements for storing traffic in buffers 172, selecting traffic to send to a next level of the arbitration hierarchy (upstream or downstream), such as using arbitration logic, and sending the selected traffic on corresponding links. In some embodiments, the functionality of control logic 174 is implemented in hardware such as circuitry. In other embodiments, the functionality of control logic 174 is implemented in a combination of hardware and software.

In an embodiment, control logic 174 selects traffic to send from buffers 172 to the next level of the arbitration hierarchy (upstream or downstream) based on weights. In some embodiments, each buffer of buffers 172 has a corresponding weight stored in one of the configuration registers 176. In some embodiments, control logic 174 selects stored traffic, such as a stored request or stored data, from a buffer with a largest weight. In some embodiments, the control logic 174 selects traffic to send from buffers 172 based on the value stored in the corresponding urgency counters 170. In an embodiment, the weight is a combination of attributes indicating priority. In some embodiments, the attributes include one or more of an age, a priority level, a quality-of-service parameter, a source identifier, an application identifier or type, such as a real-time application, an indication of traffic type, such as real-time traffic or low latency traffic or bulk traffic, and an indication of a data size associated with the request and so forth.

In an embodiment, control logic 174 also updates configuration registers 176 and urgency counters 170. In some embodiments, configuration registers 176 stores weights, thresholds and other control and status parameters. In various embodiments, each counter of urgency counters 170 is associated with a particular buffer of buffers 172. Control logic 174 maintains a respective counter of urgency counters 170 for keeping track of a period of time traffic of a particular type is blocked by upstream arbiters or a destination such as memory controller 160. When the block is removed, in an embodiment, the traffic of the particular type has priority for selection based on the value stored in the corresponding counter of urgency counters 170.

In some embodiments, when control logic 174 receives feedback from downstream arbiters or sources, control logic 174 adjusts selection priority accordingly. For example, changes in bandwidth requirement, low latency tolerance and active status cause adjustments in selection priority of stored traffic. Before describing more details of the transfer of traffic through fabric 130, a further description of the components in computing system 100 is provided.

In some embodiments, components within agent 120 are similar to components in agent 110. In other embodiments, components in agent 120 are designed for lower power consumption, and therefore, include control logic and processing capability producing less performance. In such embodiments, supported clock frequencies are less than supported clock frequencies in agent 110. In addition, one or more of the processor cores in agent 120 include a smaller number of execution pipelines and/or functional blocks for processing relatively high power consuming instructions than what is supported by the processor cores in agent 110.

Endpoints 140-150 are representative of any number and type of components coupled to fabric 130. For example, in some embodiments, endpoints 140-150 include one or more cameras, flash controllers, display controllers, media controllers, graphics units, communication interfaces such as radio communication interfaces, and/or other devices. Endpoints 140-150 are also representative of any number of input/output (I/O) interfaces or devices and provide interfaces to any type of peripheral device implementing any hardware functionality included in computing system 100. For example, in an embodiment, any of the endpoints 140-150 connect to audio peripherals such as microphones, speakers, interfaces to microphones and speakers, audio processors, digital signal processors, mixers, etc. Other I/O devices include interface controllers for various interfaces external to computing system 100, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices include networking peripherals such as media access controllers (MACs).

Memory controller 160 interfaces with system memory 162. Memory controller 160 includes any number of memory ports, generates proper clocking to memory devices, and interfaces to system memory 162. System memory 162 includes one or more of dynamic random access memory (DRAM) such as synchronous DRAM (SDRAM) (including mobile versions of the SDRAMs such as mDDR3, etc., and/or low power versions of the SDRAMs such as LPDDR4, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc.

Figure 2:
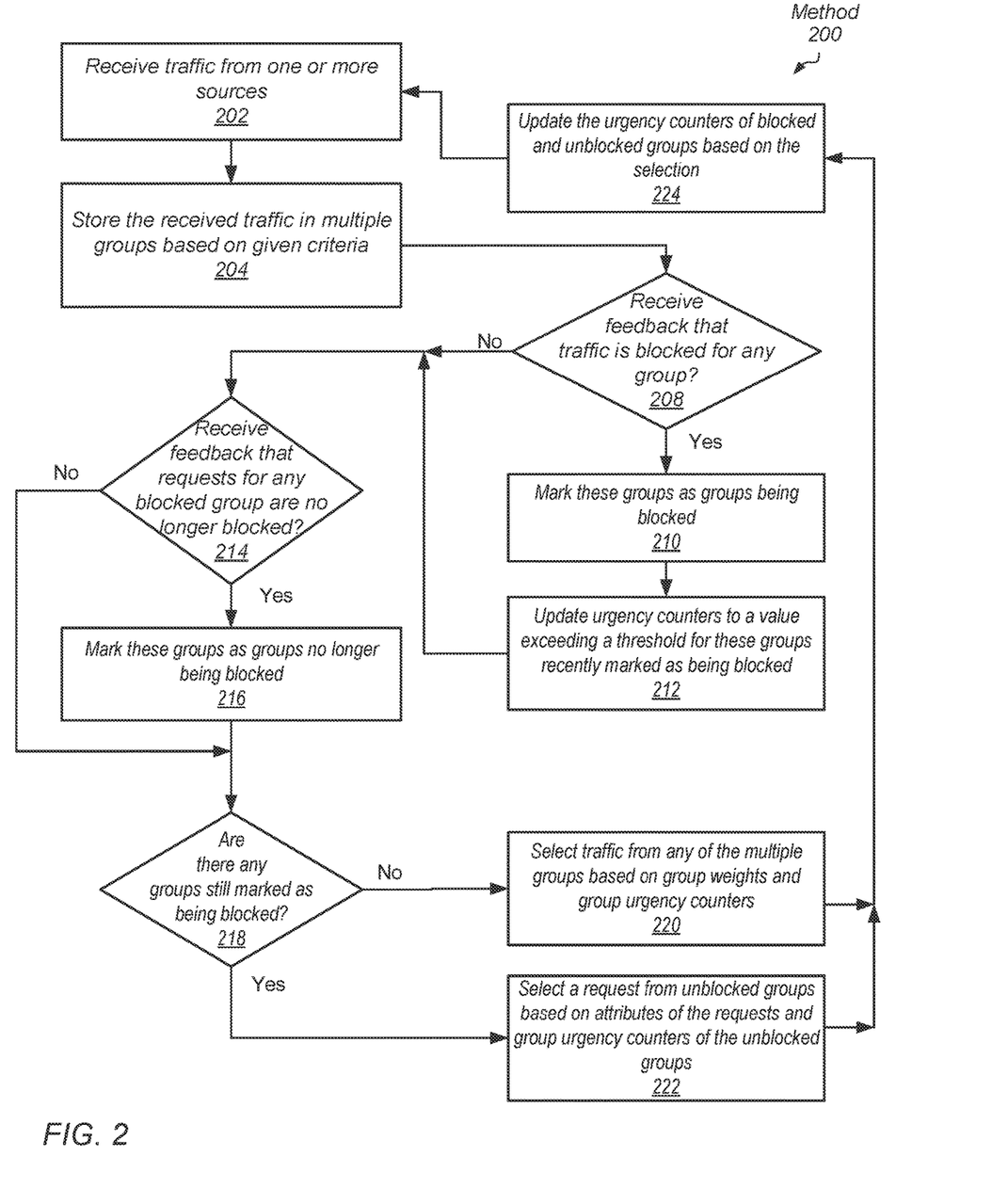
FIG. 2 is a flow diagram of one embodiment of a method for efficiently arbitrating traffic on a bus.

Referring now to FIG. 2, a generalized flow diagram of one embodiment of a method 200 for efficiently routing data in a communication fabric is shown. For purposes of discussion, the steps in this embodiment (as well as for FIGS. 3-6) are shown in sequential order. However, in other embodiments some steps may occur in a different order than shown, some steps may be performed concurrently, some steps may be combined with other steps, and some steps may be absent.

Traffic is received from one or more sources (block 202). In an embodiment, the sources include one or more of agents, endpoints and memory controllers in a computing system. The received traffic is stored in multiple groups based on given criteria (block 204). In an embodiment, each group includes a buffer for storing corresponding traffic. As described earlier, in some embodiments, the criteria includes one or more of the source of the traffic and the traffic type.

In an embodiment, an arbiter or destination does not have data storage space for receiving more traffic from an arbiter or source at a lower level of an arbitration hierarchy. Therefore, the arbiter or destination sends feedback to block traffic from a particular group. Again, the group is identified by one or more of the source of traffic and the traffic type. If feedback is received that traffic is blocked for any group ("yes" branch of the conditional block 208), then these groups are marked as groups being blocked (block 210). In an embodiment, a given status bit is asserted to indicate to arbitration logic that traffic stored in a given buffer is blocked. The given bit is stored within a buffer entry, a configuration or status register (CSR), or other.

In an embodiment, one or more urgency counters are updated to a value exceeding a threshold for these groups recently marked as being blocked (block 212). In one embodiment, the threshold is zero and the one or more urgency counters are incremented to one. In another embodiment, the threshold is set to a higher value. If feedback is received that requests for any blocked group are no longer blocked ("yes" branch of the conditional block 208), then these groups are marked as groups no longer being blocked (block 216). In an embodiment, the earlier given bit that was asserted is now negated. If no feedback is received that requests for any blocked group are no longer blocked ("no" branch of the conditional block 208), then it is determined whether there are any groups still marked as being blocked. Similarly, after marking groups as no longer being blocked, it is determined whether there are any groups still marked as being blocked.

If there are no groups still marked as being blocked ("no" branch of the conditional block 218), then stored traffic is selected from any of the multiple groups based on one or more of weights of the group and group urgency counters (block 220). However, if there are groups still marked as being blocked ("yes" branch of the conditional block 218), then stored traffic is selected from one of the multiple unblocked groups based on one or more of weights of the unblocked group and urgency counters associated with unblocked groups (block 222). As described earlier, the traffic stored in buffers include one or more of access requests, messages or commands, and data corresponding to the requests or messages. In some embodiments, a given group is selected from available (unblocked) groups with a type not being blocked based on a largest urgency count stored in a respective urgency counter. An urgency counter stores an indication of a period of time that the corresponding group was blocked.

In an embodiment, when it is determined that two or more groups have a same largest urgency count stored in respective urgency counters, a given group is selected from the two or more groups based on the weights associated with the two or more groups. As described earlier, in an embodiment, the weight is a combination of attributes indicating priority. In some embodiments, the attributes include one or more of an age, a priority level, a quality-of-service parameter, a source identifier, an application identifier or type, such as a real-time application, an indication of traffic type, such as real-time traffic or low latency traffic or bulk traffic, and an indication of a data size associated with the request and so forth. Traffic, such as a request, a message or data, is deallocated from a buffer associated with the selected group and the selected traffic is sent to the next arbiter in the arbitration hierarchy or a destination such as a memory controller for system memory, in one example.

In an embodiment, when traffic is selected for being sent on corresponding links to a next hierarchical level of the arbitration logic, the urgency counters of blocked and unblocked groups are updated based on the selection (block 224). In some embodiments, an urgency counter is incremented during each clock cycle that traffic of the particular type are unable to be received (blocked) by a next stage or level of the arbitration hierarchy. When a message is received specifying that traffic of the particular type are again able to be received (unblocked) by the next level, in an embodiment, the urgency counter is decremented during each clock cycle. In another embodiment, the urgency counter is decremented when the traffic type is unblocked and during each selection of stored traffic of the particular type.

Figure 3:
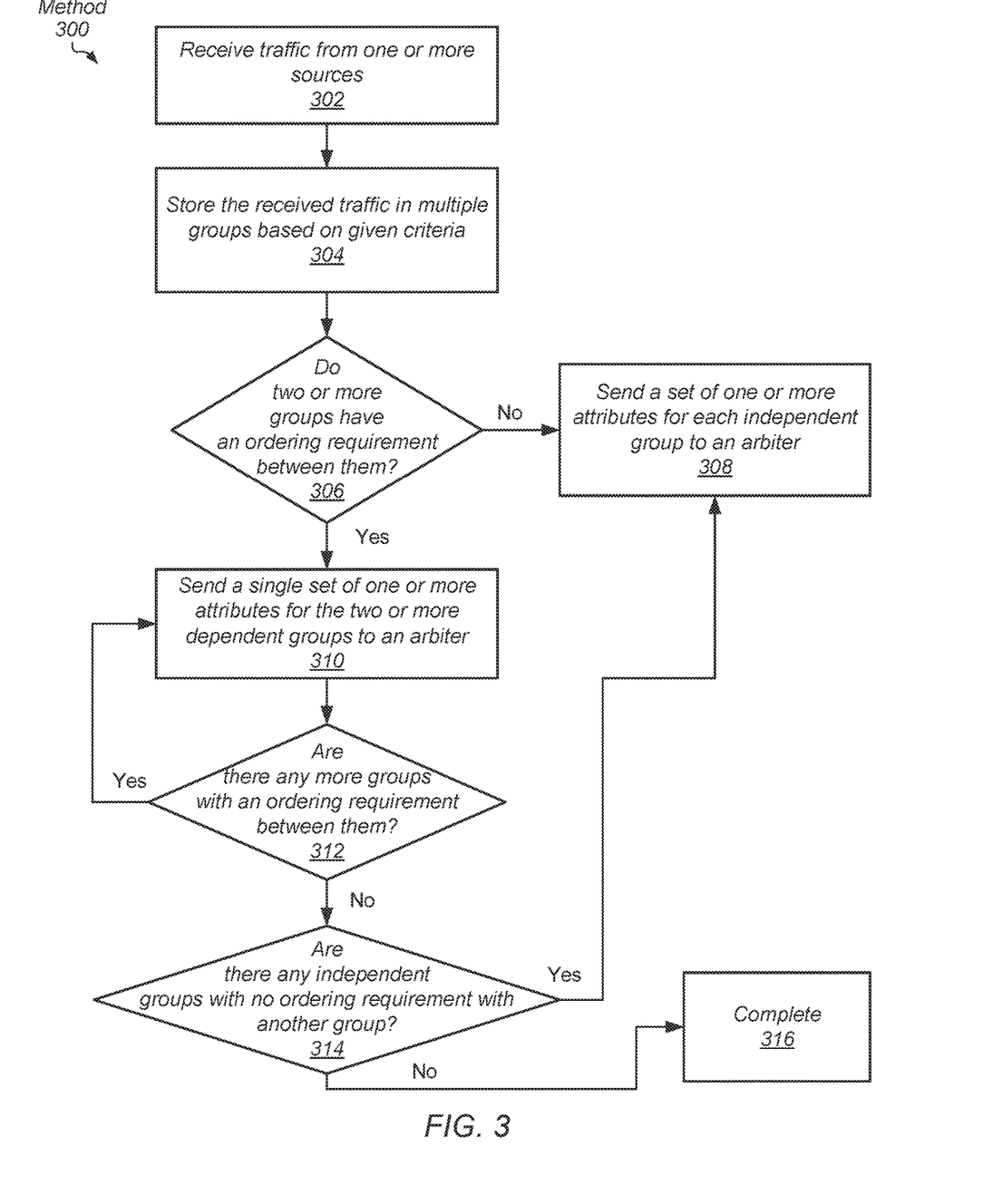
FIG. 3 is a flow diagram of one embodiment of a method for efficiently arbitrating traffic on a bus.

Referring now to FIG. 3, a generalized flow diagram of one embodiment of a method 300 for efficiently routing data in a communication fabric is shown. Traffic is received from one or more sources (block 302). In an embodiment, the sources include one or more of agents, endpoints and memory controllers in a computing system. The received traffic is stored in multiple groups based on given criteria (block 304). In an embodiment, each group includes a buffer for storing corresponding traffic. As described earlier, in some embodiments, the criteria includes one or more of the source of the traffic and the traffic type. In some embodiments, the buffers used to store received traffic include one or more queues and a data store. Each of the queues and a data store stores data in one or more of flip-flops or other types of registers, one of a variety of random access memory (RAM) cells, content addressable memory (CAM) structure, or other.

If no groups have an ordering requirement between them ("no" branch of the conditional block 306), then a set of one or more attributes for each independent group is sent to an arbiter (block 308). The arbiter selects traffic from a given group of the multiple groups to send to a next level of arbitration hierarchy. If two or more groups have an ordering requirement between them ("yes" branch of the conditional block 306), then a single set of one or more attributes for the two or more dependent groups is sent to the arbiter (block 310).

In an embodiment, the single set of attributes is a result of merging the attributes of the two or more dependent groups with an ordering dependence between them. In one embodiment, merging includes operations on individual attributes to determine a single unified set. Merging the attributes includes one or more of selecting a maximum value, selecting a minimum value, determining an average value, determining a sum, and so forth. In various embodiments, a different merge is performed for different attributes. In one example, an average urgency count is determined and put in the single set, a maximum bandwidth requirement is selected and put in the single set, a minimum low latency tolerance is selected and put in the single set, a maximum priority level is selected and placed in the single set, and so forth. In other embodiments, a sum of the urgency counts and a sum of the bandwidth requirements is determined and put in the single set. In another embodiment, only a single set of attributes is maintained for both groups.

If there are any more groups with an ordering requirement between them ("yes" branch of the conditional block 208), then control flow of method 300 returns to block 310 where a single set of attributes is determined for the two or more dependent groups with an ordering dependence between them. If there any more groups with an ordering requirement between them ("yes" branch of the conditional block 312), then there are any independent groups with no ordering requirement with another group ("yes" branch of the conditional block 314), then control flow of method 300 moves to block 308 a set of one or more attributes for each independent group is sent to an arbiter. If there are no independent groups with no ordering requirement with another group ("no" branch of the conditional block 314), then method 300 completes (block 316).

Figure 4:
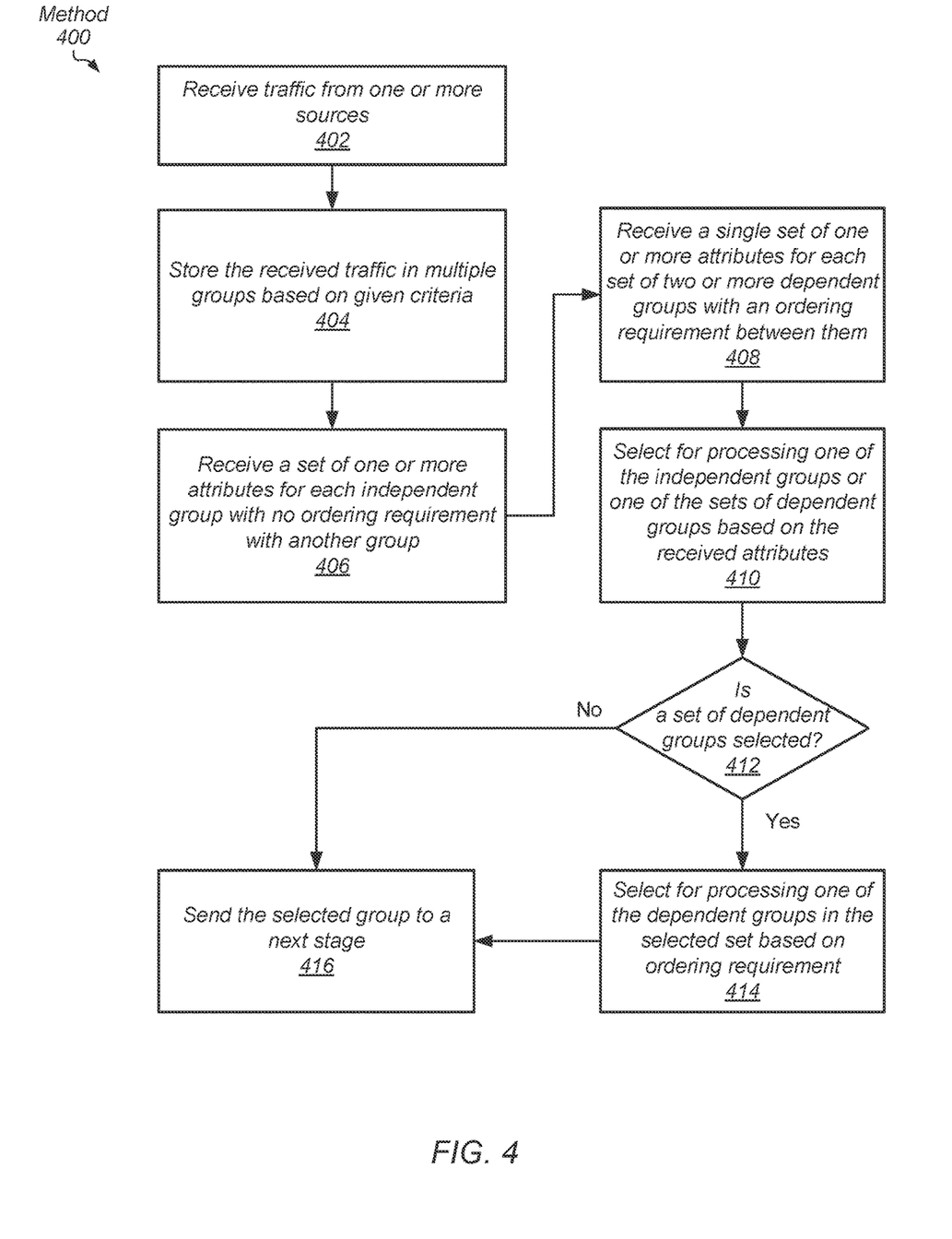
FIG. 4 is a flow diagram of one embodiment of a method for efficiently arbitrating traffic on a bus.

Referring now to FIG. 4, a generalized flow diagram of one embodiment of a method 400 for efficiently routing data in a communication fabric is shown. Traffic is received from one or more sources (block 402). In an embodiment, the sources include one or more of agents, endpoints and memory controllers in a computing system. The received traffic is stored in multiple groups based on given criteria (block 404). In an embodiment, each group includes a buffer for storing corresponding traffic. As described earlier, in some embodiments, the criteria includes one or more of the source of the traffic and the traffic type.

A set of one or more attributes is received for each independent group with no ordering requirement with another group (block 406). Additionally, a single set of one or more attributes is received for each set of two or more dependent groups with an ordering requirement between them (block 408). One of the independent groups or one of the sets of dependent groups is selected based on the received attributes (block 410). As described earlier, in some embodiments, arbitration logic selects a stored request or other traffic from any of the multiple buffers associated with unblocked groups on a largest urgency count. In an embodiment, it is determined two or more unblocked groups have a same largest urgency count, stored traffic is selected from an unblocked group based on the weights associated with the two or more unblocked groups. Examples of weights was provided earlier. For groups with an ordering dependence between them, a single set of attributes created by merging the attributes of the dependent groups is compared to the attributes of independent groups with no ordering dependence between them.

If a set of dependent groups is not selected ("no" branch of the conditional block 412), then traffic of the selected group is sent to a next stage of arbitration hierarchy or to the destination if the last level of the arbitration hierarchy is already reached (block 416). If a set of dependent groups is not selected ("yes" branch of the conditional block 412), then one group of the dependent groups in the selected set is selected based on ordering requirement (block 414).

Afterward, traffic of the selected group is sent to a next stage of arbitration hierarchy or to the destination (block 416).

Figure 5:
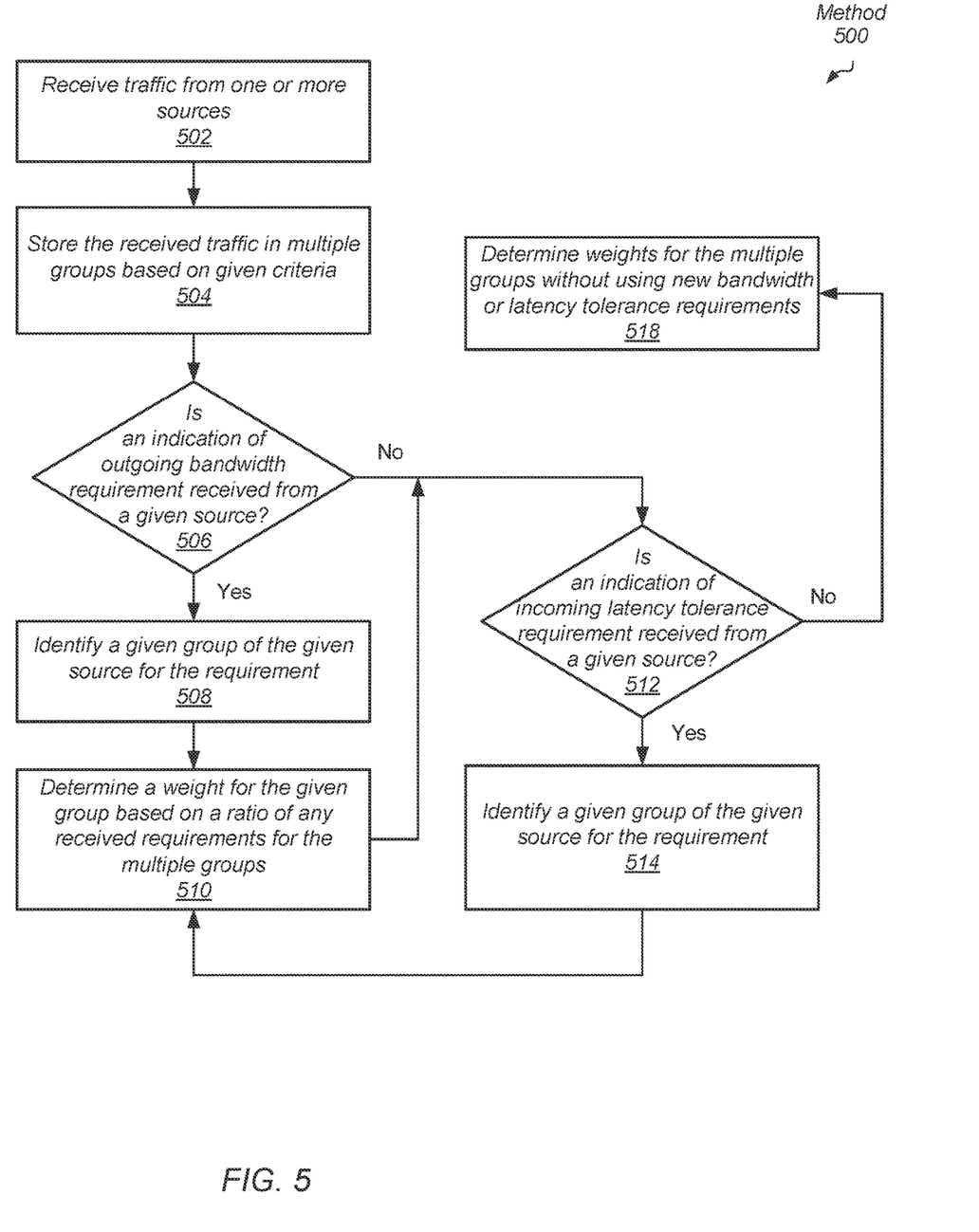
FIG. 5 is a flow diagram of one embodiment of a method for efficiently arbitrating traffic on a bus.

Referring now to FIG. 5, a generalized flow diagram of one embodiment of a method 500 for efficiently routing data in a communication fabric is shown. Traffic is received from one or more sources (block 502). In an embodiment, the sources include one or more of agents, endpoints and memory controllers in a computing system. The received traffic is stored in multiple groups based on given criteria (block 504). In an embodiment, each group includes a buffer for storing corresponding traffic. As described earlier, in some embodiments, the criteria includes one or more of the source of the traffic and the traffic type.

If an indication of outgoing bandwidth requirement is received from a given source ("yes" branch of the conditional block 506), then a given group of the given source is identified for the requirement (block 508). For example, in some embodiments, a given processor in the given source is made aware of an upcoming workload by the operating system scheduling tasks. As a result, the processor sends a sideband message to an arbiter in the fabric. The sideband message indicates that in a next period of time, such as one microsecond, the outgoing bandwidth requirement for the processor is going to be a given amount such as 10 gigabytes per second, in one example. In some embodiments, the indicated outgoing bandwidth requirement is for a particular traffic type such as RT traffic type. In some embodiments, this indication is passed up the arbitration hierarchy to other arbiters in other levels.

A weight is determined for the given group based on a ratio of any received bandwidth requirements for the multiple groups (block 510). For example, if a single outgoing bandwidth requirement is received, and this requirement is relatively high, then the weight used for arbitration for the given source is increased by a particular amount relative to the received outgoing bandwidth requirement. If multiple outgoing bandwidth requirements are received, then the weights of the corresponding groups are adjusted (increased or decreased) based on a ratio of the received multiple outgoing bandwidth requirements.

If an indication of incoming latency tolerance is received from a given source ("yes" branch of the conditional block 512), then a given group of the given source is identified for the requirement (block 514). For example, in some embodiments, a given processor in the given source is made aware of an upcoming workload by the operating system scheduling tasks, such as video display processing, and the latency tolerance appreciably reduces. As described above, the processor sends a sideband message to an arbiter in the fabric. The sideband message indicates the reduced upcoming latency tolerance for a next period of time.

In some embodiments, the indicated latency tolerance requirement is for a particular traffic type such as RT traffic type. In some embodiments, this indication is passed up the arbitration hierarchy to other arbiters in other levels. Afterward, control flow of method 500 moves to block 510 where a weight is determined for the given group based on a ratio of any received latency tolerance requirements for the multiple groups. For example, if a single latency tolerance requirement is received, and this tolerance is relatively low, then the weight used for arbitration for the given source is increased by a particular amount relative to the received latency tolerance requirement. If multiple latency tolerance requirements are received, then the weights of the corresponding groups are adjusted (increased or decreased) based on a ratio of the received multiple latency tolerance requirements.

Figure 6:
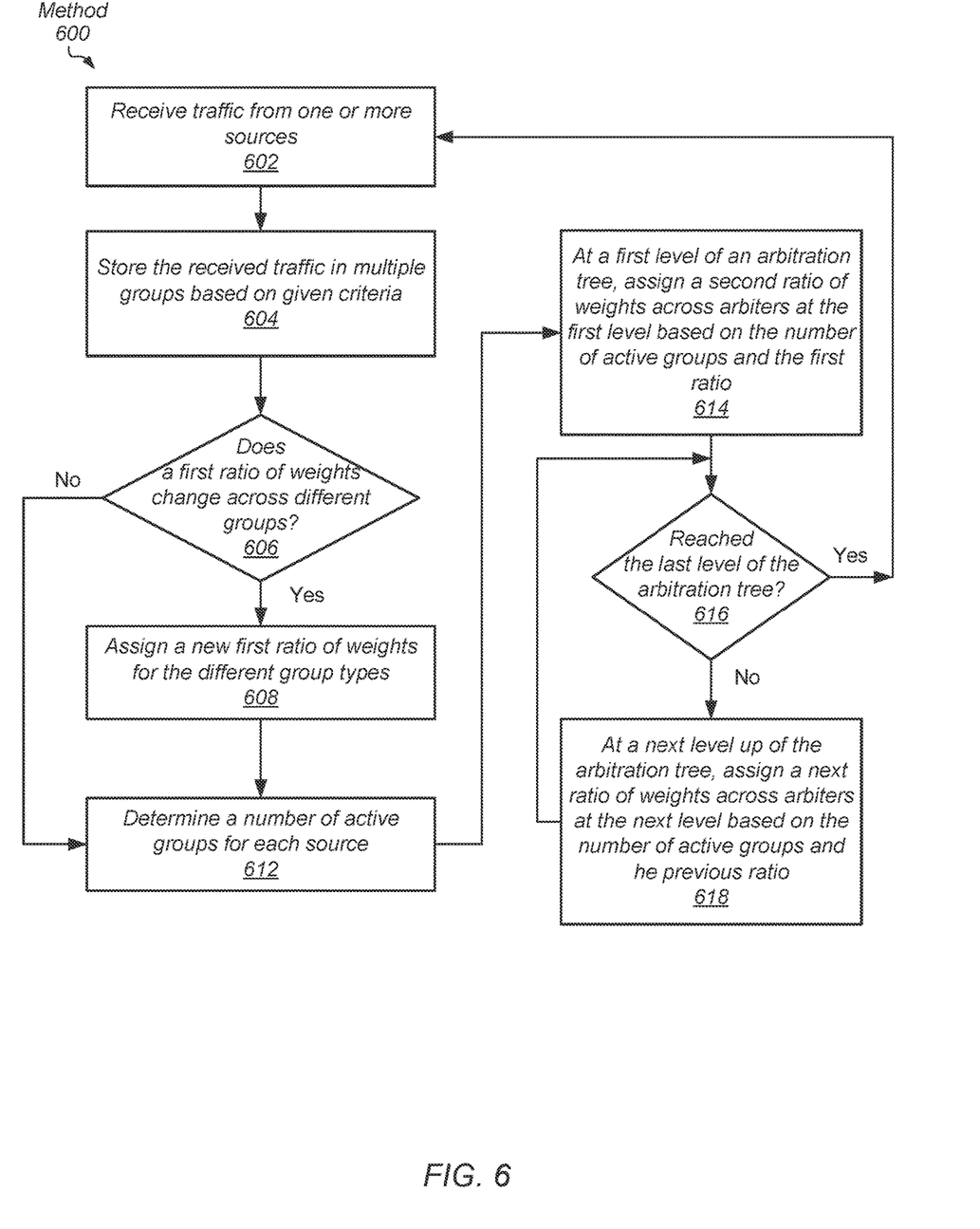
FIG. 6 is a flow diagram of one embodiment of a method for efficiently arbitrating traffic on a bus.

Referring now to FIG. 6, a generalized flow diagram of one embodiment of a method 600 for scheduling requests is shown. In various embodiments, an arbiter is used for scheduling read requests and write requests. The arbiter selects requests for processing from multiple stored requests based on one or more attributes of the multiple stored requests. In an embodiment, the one or more attributes include a weight and an indication of a data size associated with the request. If a given request is selected by an arbiter ("yes" branch of the conditional block 602), then the given request is sent for processing (block 604).

In some embodiments, an initial or default set of weights are assigned to the multiple groups. In one example, a weight of 1 is assigned to traffic of a bulk type, a weight of 5 is assigned to traffic of a low latency tolerance (LLT) type, and a weight of 10 is assigned to traffic of a real-time (RT) type. If this first ratio of weights change across different groups ("yes" branch of the conditional block 606), then a new first ratio of weights for the different groups are assigned (block 608). In some embodiments, the initial or default set of weights are stored in configuration and status registers that are updated by hardware or software.

A number of active groups is determined for each source (block 612). In an embodiment, agents in a computing system become idle and a power manager sets a corresponding power-performance state for the agent. In some embodiments, the agent sends an indication to an arbiter in the fabric specifying that the agent is idle. In other embodiments, a power manager for the chip sends the indication to the arbiter in the fabric. By being idle, the agent is considered to be inactive. At a first level of an arbitration tree or arbitration hierarchy, a second ratio of weights are assigned across arbiters at the first level based on the number of active groups and the first ratio (block 614).

In one example, an arbiter receives traffic from three agents, and the arbiter assigns an equal ratio of one third to one third to one third to the three agents. Therefore, in an example, traffic of bulk type has a total weight of 6 with each of the links of bulk type from the three agents each being assigned a weight of 2. Similarly, traffic of LLT type has a total weight of 30 with each of the links of LLT type from the three agents each being assigned a weight of 10. Assignment of weights for traffic of RT type is performed in a similar manner. However, if the arbiter receives an indication that the third agent becomes idle (inactive), then the arbiter determines that there are now only two active sources (agents). Therefore, the arbiter reassigns the weights. Traffic of bulk type has a total weight of 6 with each of the links of bulk type from the two active agents each being assigned a weight of 3 versus the original weight of 2. Similarly, traffic of LLT type has a total weight of 30 with each of the links of LLT type from the two active agents each being assigned a weight of 15 versus the original weight of 10. Assignment of weights for traffic of RT type is performed in a similar manner.

If the last level of the arbitration tree (hierarchy) is reached ("yes" branch of the conditional block 616), then control flow of method 600 returns to block 602. If the last level of the arbitration tree (hierarchy) is not reached ("no" branch of the conditional block 616), then at a next level up of the arbitration tree (hierarchy), a next ratio of weights is assigned across arbiters at the next level based on the number of active groups and he previous ratio (block 618). Similar steps performed in block 614 are performed again at the next level. In one example, a parent arbiter receives traffic from a first child arbiter and a second child arbiter. The first child arbiter receives traffic from two agents, whereas, the second child arbiter receives traffic from three agents. When the parent arbiter receives an indication that the second child arbiter has only one active agent, rather than three active agents, then the parent arbiter reassigns weights accordingly. For example, now, the first child arbiter receives traffic from two active agents, whereas, the second child arbiter receives traffic from one active agent, rather than three active agents. The parent arbiter reassigns the weights at its level according to a two-to-one ratio.

If traffic of a bulk type has a total weight of 60 for the parent arbiter, then the original weights are distributed as a weight of 24 to the first child arbiter and a weight of 36 to the second child arbiter due to the original two-to-three ratio of active agents. Now, traffic of bulk type still has a total weight of 60, but the weights are distributed as a weight of 40 to the first child arbiter and a weight of 20 to the second child arbiter due to the new two-to-one ratio of active agents. Assignments of weights for traffic of LLT type and RT type are performed in a similar manner. Further, the weights are adjusted based on any received feedback of bandwidth requirements and latency tolerance requirements. In an embodiment, this feedback traverses up the arbitration hierarchy.

Figure 7:
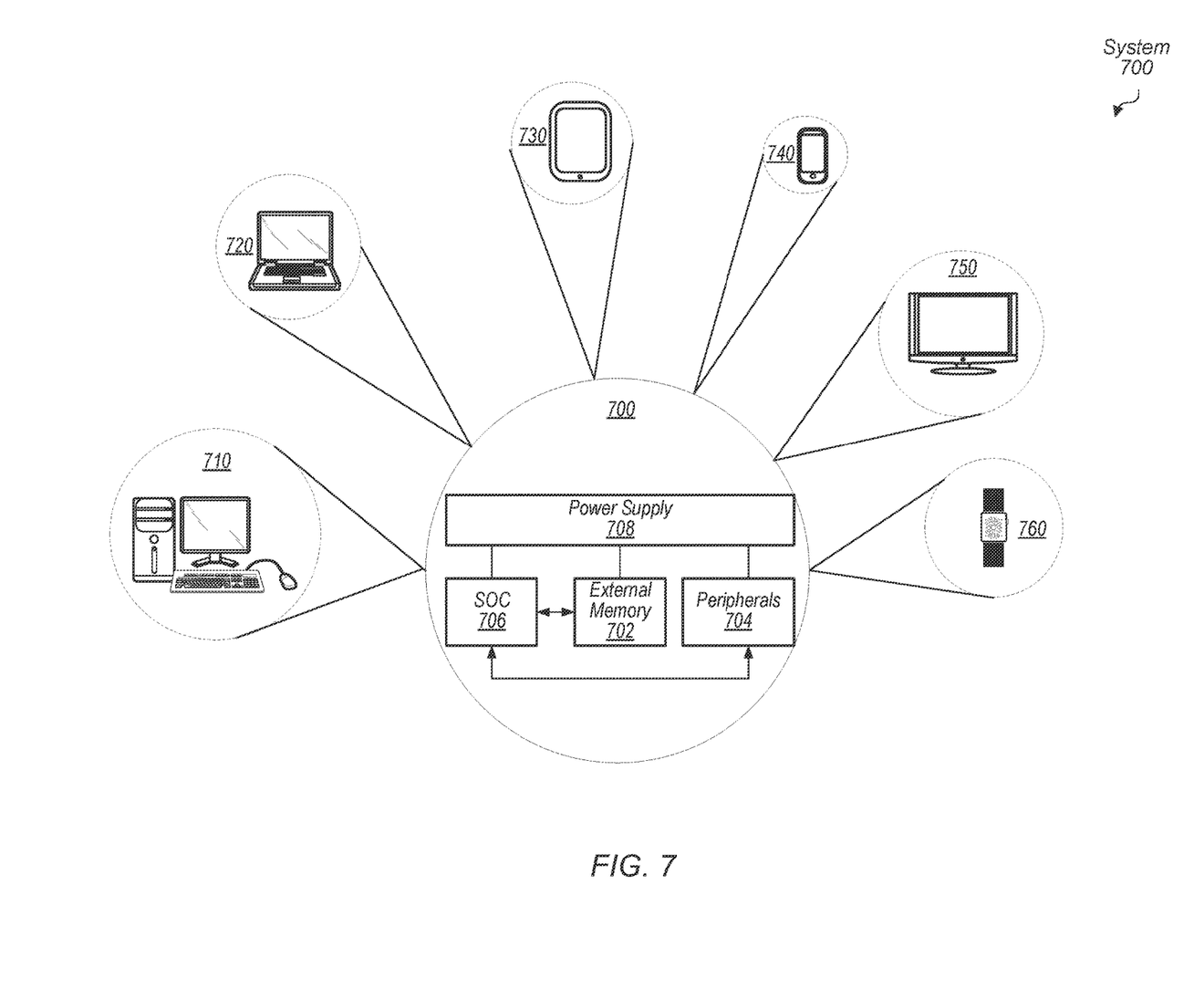
FIG. 7 is a block diagram of one embodiment of a system.

Turning next to FIG. 7, a block diagram of one embodiment of a system 700 is shown. As shown, system 700 may represent chip, circuitry, components, etc., of a desktop computer 710, laptop computer 720, tablet computer 730, cell or mobile phone 740, television 750 (or set top box coupled to a television), wrist watch or other wearable item 760, or otherwise. Other devices are possible and are contemplated. In the illustrated embodiment, the system 700 includes at least one instance of a system on chip (SoC) 706 which includes multiple agents, multiple endpoints, a communication fabric, one or more data stores, and an arbiter within one or more of the agents and endpoints for reducing latencies between commands being sent to the fabric and corresponding data being sent to the fabric. For example, in some embodiments, SoC 706 includes components similar to computing system 100 (of FIG. 1). In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer). In some embodiments, more than one instance of SoC 706 is included (and more than one external memory 702 may be included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a first interface configured to receive requests corresponding to a given type of request from a first source and a second source;
   a plurality of buffers configured to store the requests;
   a second interface configured to receive messages from an arbiter; and
   control circuitry configured to:
   in response to a determination that a group of two or more buffers store types of requests with an ordering dependence between them:
      determine merged attributes of the two or more buffers within the group; and
      use the merged attributes when selecting requests of a type not being blocked.

2. The apparatus as recited in claim 1, wherein the merged attributes comprise a single set of one or more attributes for the two or more buffers that store types of request with an ordering dependence between them, and the control circuitry is configured to send the single set of one or more attributes to the arbiter via the second interface.

3. The apparatus as recited in claim 2, wherein the merged attributes comprise one or more of a merged bandwidth requirement and a merged count for the group, wherein the merged bandwidth requirement is based on bandwidth requirements of the two or more buffers within the group and the merged count is based on counts corresponding to the two or more buffers within the group.

4. The apparatus as recited in claim 3, wherein use of the merged attributes comprises use of one or more of the merged bandwidth requirement and the merged count when selecting requests of the type not being blocked.

5. The apparatus as recited in claim 3, wherein in response to determining the one or more of the merged bandwidth requirement and the merged count cause the group to be selected, the control circuitry is configured to:
   select a stored request from a buffer of the two or more buffers in the group based on the ordering dependence between requests in the group; and send the selected stored request to the arbiter via the second interface.

6. The apparatus as recited in claim 1, wherein the merged attributes comprise one or more of a maximum bandwidth requirement, a latency tolerance, a maximum priority level, and an urgency count.

7. The apparatus as recited in claim 1, wherein the control circuitry is configured to:
receive a message from the arbiter indicating the arbiter is unable to receive transactions of a given type; and
maintain a counter that indicates a period of time the arbiter is unable to receive transactions of the given type.

8. The apparatus as recited in claim 1, wherein the control circuitry is configured to:
assign a priority to each of the first source and the second source;
in response to receipt, via the first interface, an indication of active and inactive status for the first source and the second source:
determine a ratio of a maximum number of active requests of a first type generated by the first source to a maximum number of active requests of a second type generated by the second source; and
adjust a priority for each of the first source and the second source based on the ratio.

9. The apparatus as recited in claim 1, wherein the control circuitry is configured to:
store requests received from a plurality of agents in buffers of the plurality of buffers;
assign an initial arbitration weight to requests of a first type stored in the plurality of buffers, based in part on the first type and a status of the plurality of agents;
receive an indication of a change in status of an agent of the plurality of agents;
assign a new arbitration weight to requests of the first type, based at least in part on the indication; and
select a request from the plurality of buffers, based at least in part on a corresponding arbitration weight.

10. The apparatus as recited in claim 9, wherein a product of the new arbitration weight and a number of active agents subsequent to receipt of the indication is equal to a product of the initial arbitration weight and a number of active agents prior to receipt of the indication.

11. A method comprising:
receiving, via a first interface, requests corresponding to a given type of request from a first source and a second source;
storing the requests in one or more buffers of a plurality of buffers;
receiving, via a second interface, messages from an arbiter; and
in response to determining, by control circuitry, a group of two or more buffers store types of requests with an ordering dependence between them:
determining merged attributes of the two or more buffers within the group; and
using the merged attributes when selecting requests of a type not being blocked.

12. The method as recited in claim 11, wherein the merged attributes comprise a single set of one or more attributes for the two or more buffers that store types of request with an ordering dependence between them, and the method further comprises sending the single set of one or more attributes to the arbiter via the second interface.

13. The method as recited in claim 12, wherein the merged attributes comprise one or more of a merged bandwidth requirement and a merged count for the group, wherein the merged bandwidth requirement is based on bandwidth requirements of the two or more buffers within the group and the merged count is based on counts corresponding to the two or more buffers within the group.

14. The method as recited in claim 13, wherein using the merged attributes comprises using one or more of the merged bandwidth requirement and the merged count when selecting requests of the type not being blocked.

15. The method as recited in claim 13, wherein in response to determining the one or more of the merged bandwidth requirement and the merged count cause the group to be selected, the method further comprises:
selecting a stored request from a buffer of the two or more buffers in the group based on the ordering dependence between requests in the group; and
sending the selected stored request to the arbiter via the second interface.

16. The method as recited in claim 11, wherein the merged attributes comprise one or more of a maximum bandwidth requirement, a latency tolerance, a maximum priority level, and an urgency count.

17. The method as recited in claim 11, further comprising:
receiving a message from the arbiter indicating the arbiter is unable to receive transactions of a given type; and
maintaining a counter that indicates a period of time the arbiter is unable to receive transactions of the given type.

18. The method as recited in claim 17, further comprising incrementing the counter during a period of time that requests of the given type are unable to be received by the arbiter.

19. A system comprising:
a first arbiter comprising circuitry configured to receive requests corresponding to a given type of request from a first source and a second source; and
a second arbiter comprising circuitry configured to convey messages to the first arbiter;
wherein in response to determining a group of two or more buffers store types of requests with an ordering dependence between them, the first arbiter is configured to:
determine merged attributes of the two or more buffers within the group; and
use the merged attributes when selecting requests of a type not blocked by the second arbiter.

20. The system as recited in claim 19, wherein the merged attributes comprise a single set of one or more attributes for the group of two or more buffers that store types of requests with an ordering dependence between them, and the first arbiter is configured to send the single set of one or more attributes to the second arbiter.

* * * * *